United States Patent Office

3,799,912
Patented Mar. 26, 1974

3,799,912
PROCESS FOR THE POLYMERIZATION OF DODECALACTAM IN THE PRESENCE OF POTASSIUM HYDROXIDE
Remy Hebert, Serquigny, France assignor to Societe Anonyme dite: Aquitaine-Total Organico Tour Aquitaine, Courbevoie, France
No Drawing. Filed Nov. 30, 1971, Ser. No. 203,432
Claims priority, application France, Nov. 30, 1970, 7042887
Int. Cl. C08g 20/18
U.S. Cl. 260—78 L          14 Claims

ABSTRACT OF THE DISCLOSURE

This invention concerns a process for the polymerization of dodecalactam, in the presence of potassium hydroxide and water, offering a fast way of obtaining a high yield of polyamides with high molecular weight and with excellent resistance to degradation, and consequently hydrolysis, when kept in contact with boiling water.

Polymerization is carried out, preferably at between 290 and 320° C., in the presence of between 0.05 and 2% potassium hydroxide.

The polymers thus obtained can be used easily to manufacture moulded articles, sheets, tubes or pipes, by extrusion, injection or blowing.

---

The present invention concerns a process for the polymerization of dodecalactam in the presence of potassium hydroxide, offering a fast way of obtaining a very high yield of polyamides with particularly useful properties, notably, resistance to degradation in boiling water. As used in the specification and in the claims, the term "potash" which is derived from the French word "potasse" is meant to be "potassium hydroxide."

It is known that dodecalactam can be converted into polydodecanamide by heating it in the presence of inorganic acids such as phosphoric or hypophosphorous acid, or in the presence of organic acids such as acetic, adipic or sebacic acid.

These catalysts facilitate the polymerization and speed it up by first opening the 12-carbon-atom ring, thereby converting the dodecalactam into amino-dodecanoic acid. The reaction then continues by polyaddition. But since they do not remain inactive in the final polymer, these catalyst usually have an adverse effect on the molecular weight of the 12-polyamide, which shows a tendency to degradation when kept in contact with boiling water. Some applications are at present impossible for 12-polyamides, including the washing machine industry, where 12-polyamide could be used for gear-wheels, pinions, etc., foodstuff industries, where 12-polyamides could be used for tubes carrying water or hot aqueous liquids, and which are very often sterilized with steam, and the motor-car industry, where 12-polyamides could be used, among other things, for making radiator seals. After being in contact for a certain amount of time wtih boiling water, the 12-polyamides become weakened and brittle, and therefore unsuitable for such purposes. Polyamide solution viscosity measurements show that the rings have been split as a result of hydrolysis.

The process according to the invention offers a way of obtaining, at high speed and with a yield of more than 99%, polyamides with high molecular weight and with excellent resistance to degradation, and consequently to hydrolysis, when kept in contact with boiling water.

The present invention concerns a process for polymerizing dodecalactam in the presence of water, using potassium hydroxide as a catalyst, at a temperature kept at 280° C. or above during most of the polymerization reaction, and preferably at between 290 and 320° C. The amount of catalyst is usually between 0.05 and 2% of the weight of the mixture to be polymerized, and preferably between 0.1 and 0.5%.

According to one embodiment of the present invention, the dodacalactam may be polymerized alone, or mixed with other monomers which can produce polyamides. These monomer mixtures for polymerization should contain more than 50%, and preferably more than 80%, moles of dodecalactam. The comonomers that can be used include lactams such as caprolactam, oenantholactam and copryllactam, amino-acids such as aminocaproic and amino-undecanoic acid, diacid and diamine salts such as hexamethylene diamine adipate, hexamethylene diamine sebacate and dilinoleic acid salt with diamine dimer.

During the process, the catalyst is added to the monomer lactam, and the dodecalactam is converted into a 12-polyamide, in the presence of water, at temperatures of between 280 and 335° C., and at high pressure, normal pressure or even in a vacuum. It is advisable to perform the first stage of the reaction under pressure, and later reduce the pressure, in an inert gas atmosphere, such as nitrogen or carbon dioxide. The last stage may also be carried out in a vacuum, in order to remove more quickly the water vapor that forms.

The process may be performed continuously or intermittently in existing lactam polymerization apparatuses, such as tubes allowing simple continuous reaction, or in autoclaves with or without stirring devices.

Polymerization may also be performed in the presence of heat or light stabilizing agents, plasticizers, fillers, matting agents, pigments, coloring agents or other similar substances.

The length of the operation may vary depending on the degree of polymerization required, and the temperature and concentration of catalyst. It is usually between 2 and 10 hours.

The whole operation may be performed at a single temperature, above 280° C., but it is also possible to complete it at lower temperatures, such as 250° C. cr thereabouts, or even at temperatures below the melting point of the polyamide, in other words below 180° C.

Polyamides obtained by means of this process are particularly resistant to degradation when they are in contact with boiling water. This resistance may be improved, and this constitutes an improvement in the present invention, by adding phenols to the polyamides. The phenols are generally added to these potassium polyamides by extrusion. The phenols used are preferably amino-phenols, including lauryl-amino-phenol and stearyl-amino-phenol. The amount of amino-phenol is usually between 0.2 and 5%, and preferably between 0.6 and 1.2%, of the amount of 12-polyamide.

The polymers obtained by means of the process according to the present invention are suitable for use in all cases requiring polyamides, particularly those with good resistance to degradation in boiling water, and good dimensional stability.

Such polymers can easily be used to manufacture moulded articles, sheets, tubes or pipes, by blowing, injection or extrusion. Because of the resistance to degradation in the presence of boiling water, these polyamides are particularly recommended for use in the foodstuff industry, since they can be sterilized with steam, without any problems.

They may also be used to manufacture powders for coatings.

The present invention is illustrated by, without in any way being confined to, the following examples.

EXAMPLE 1

14 kg. of dodecalactam, 420 cc. of distilled water and 0.1% potassium hydroxide (calculated as a percentage of the weight of dodecalactam) are placed in a small stainless steel polymerization autoclave.

The air is removed from the autoclave by draining with nitrogen, and it is tightly closed and heated to 300° C. The pressure is raised to 25 kg., and it is kept at this temperature and pressure for 3 hours. The pressure is then gradually released over about 4 hours, until it reaches atmospheric level. A slow, uninterrupted current of nitrogen is blown over the surface of the molten mixture, and after about 2 hours the polymer is extruded through a nozzle at the bottom of the autoclave. This polyamide is passed through cold water to cool it, granulated, and dried until the moisture content is approximately 0.04%. The amount of residual lactam is less than 0.5%. The melting viscosity is measured by means of an apparatus similar to the ASTM-D-1238 melt indexer, and it is found that the quantity heated to 240° C. and extruded at a pressure of 2 kg./sq. cm., through a nozzle 3 mm. in diameter and 9 mm. long, is about 700 mg.

The inherent viscosity, in metacresol at 20° C., with a 0.5% concentration, is 1.6.

Tubing is then made by extrusion, using the granules to feed the hopper of an extruder with a nozzle for 10–14 mm. tubing at the end.

The tubes thus obtained are then dipped in boiling water. After 600 hours, the viscosity is found not to have varied, and the tubes are as flexible as before entering the water.

When the same test is repeated, replacing the potassium hydroxide by phosphoric acid, it is found that after 600 hours in boiling water the polyamide has become very brittle, and that its inherent viscosity has dropped considerably.

EXAMPLE 2

14 kg. of dodecalactam; 420 cc. of distilled water and 0.3% potassium hydroxide (calculated as a percentage of the weight of dodecalactam) are placed in turn in the polymerization autoclave used in Example 1.

It is drained with nitrogen and heated to 300° C. The pressure is raised to 25 kg. After 3 hours at this temperature, the pressure is reduced over 4 hours to atmospheric level. After 2 hours' sweeping with nitrogen, the product is extruded and collected in cold water, before being granulated.

The granules are dried until the moisture content is approximately 0.04%. The amount of residual lactam is around 0.5%.

The melting viscosity is measured by means of an apparatus similar to the ASTM-D-1238 melt indexer, and it is found that the quantity heated to 240° C. and extruded at a pressure of 2 kg./sq. cm., through a nozzle 1.35 mm. in diameter and 9 mm. long, is about 800 mg.

The inherent viscosity, in metacresol at 20° C., with a 0.5% concentration, is approximately 1.1.

Plates 1 mm. thick are injection moulded from this polyamide, and they are dipped in boiling water. After 600 hours, they shown no traces of deterioration, and remain as flexible as before entering the water. When measured, the viscosity is found not to have changed since the start of the test.

When the same test is repeated, but replacing the potassium hydroxide by phosphoric acid, the plates are found to become extremely brittle, and their inherent viscosity drops to 0.7.

What is claimed is:

1. A process for the polymerization of dodecalactam to a moldable polyamide in which most of the polymerization operation is performed in the presence of water, at a temperature of between 280 and 335° C., using potassium hydroxide as a catalyst.

2. A process according to claim 1, in which the concentration of potassium hydroxide in the reaction mixture is between 0.05 and 2%.

3. A process according to claim 2, in which the concentration of potassium hydroxide in the reaction mixture is between 0.1 and 0.5%.

4. A process according to claim 1, in which the temperature is between 290 and 320° C.

5. A process according to claim 1, in which the dodecalactam is copolymerized with another lactam.

6. A process according to claim 5, in which the dodecalactam is copolymerized with caprolactam.

7. A process according to claim 1, in which the dodecalactam is copolymerized with an amino-acid.

8. A process according to claim 7, in which the dodecalactam is copolymerized with amino-undecanoic acid.

9. A process according to claim 1, in which the dodecalactam is copolymerized with a salt of a diacid with a diamine.

10. A process according to claim 9, in which the dodecalactam, is copolymerized with hexamethylene diamine adipate.

11. A process according to claim 1, in which the polymerization is completed at temperatures of below 280° C.

12. A process according to claim 11, in which polymerization is completed at between 240 and 260° C.

13. A process according to claim 11, in which polymerization is completed at temperatures of less than 180° C.

14. A process according to claim 13, in which polymerization is completed at temperatures of between 150 and 170° C.

References Cited

UNITED STATES PATENTS

| | | | |
|---|---|---|---|
| 2,638,463 | 5/1953 | Ney et al. | 260—78 P |
| 3,488,326 | 1/1970 | Van Beveren et al. | 260—78 L |
| 3,639,359 | 2/1972 | Garritsen et al. | 260—78 L |

OTHER REFERENCES

Grant, J., Hackh's Chemical Dictionary, third edition, 1944, McGraw-Hill Brook Co., Inc., N.Y. p. 676, QD5H3.

Rose, A. et al., The Condensed Chemical Dictionary, 1966, Reinhold Pub. Corp., N.Y., p. 771, QD5C5.

Patterson, A. M.: A French-English Dictionary for Chemists (2nd ed.), 1954, John Wiley, N.Y., p. 351, QD5P25 1954.

LUCILLE M. PHYNES, Primary Examiner

U.S. Cl. X.R.

260—45.9 R